United States Patent [19]

Blondin

[11] Patent Number: 5,278,358
[45] Date of Patent: Jan. 11, 1994

[54] UNDER-SEA REPEATER ACCESS CABLE

[75] Inventor: Jean-Francois Blondin, Coulogne, France

[73] Assignee: Alcatel Cable, Clichy Cedex, France

[21] Appl. No.: 879,187

[22] Filed: May 6, 1992

[30] Foreign Application Priority Data

May 7, 1991 [FR] France .................. 91 05577

[51] Int. Cl.⁵ .......................................... H02G 15/14
[52] U.S. Cl. ................. 174/70 S; 174/70 R; 385/76; 385/78; 385/80; 385/87
[58] Field of Search ............. 174/70S, 70R; 385/80, 86, 385/87, 76, 78

[56] References Cited

U.S. PATENT DOCUMENTS

| | | | |
|---|---|---|---|
| 4,172,212 | 10/1979 | Heinzer | 174/70 S X |
| 4,263,473 | 4/1981 | Recton | 174/70 S |
| 4,330,171 | 5/1982 | Malsot et al. | 385/80 |
| 4,482,201 | 11/1984 | Dousset | 385/80 |
| 4,595,256 | 6/1986 | Guazzo | 174/70 R X |
| 4,601,536 | 7/1986 | Guazzo | 174/70 R X |
| 4,746,194 | 5/1988 | Rasmussen | 385/80 |
| 4,761,051 | 8/1988 | Crespo Ruiz et al. | 385/80 X |
| 4,786,759 | 11/1988 | Gouverneur | 174/70 S |

FOREIGN PATENT DOCUMENTS 2027932 2/1980 United Kingdom .
2197287 5/1988 United Kingdom .

Primary Examiner—Leo P. Picard
Assistant Examiner—Hyung S. Sough
Attorney, Agent, or Firm—Sughrue, Mion, Zinn, Macpeak & Seas

[57] ABSTRACT

A repeater access cable contains transmission members enclosed in a protective tube which is in turn covered by a sheath, and which has a free end making a connection to a splice box. The free end is equipped with a coupling fixed on the protective tube stripped of its sheath. The repeater access cable coupling screws onto an entrance of the splice box and is fixed by crimping and gluing that end portion of the coupling which remains outside the splice box onto the protective tube. The connection has application to an optical cable under-sea link.

6 Claims, 2 Drawing Sheets

UNDER-SEA REPEATER ACCESS CABLE

The present invention relates to long-distance undersea transmission links via optical fiber cable equipped with submerged repeaters, and more particularly to connecting the repeaters to the line cable via the access cables of the repeaters.

BACKGROUND OF THE INVENTION

In known manner, submerged repeater equipment is mounted in a watertight protective metal case contained in or constituting a cylindrical cask or housing of high mechanical strength, in particular as regards withstanding traction forces. The housing is fixed at each of its ends via a hinge system to a housing of analogous strength containing a line cable splice box for connection to the line cable. Each end of the metal case of the repeater is equipped with a lead-in cable connected to the internal equipment of the repeater via a watertight bushing through the wall of the case. The lead-in cable is referred to as the "repeater access cable". When the installation is being laid, the free end of the access cable is connected to the line cable inside the splice box, and is fixed in the wall of the splice box via a coupling where it enters the splice box.

The repeater access cable is formed of a conductive tube conveying the current for remotely powering the repeater from the splice box, which tube is covered by a polyethylene sheath providing electrical protection therefor, and encloses optical fibers which are thus protected, which lie stress-free inside the tube, and which provide transmission between the splice box and the repeater. The tube is corkscrew-shaped at least on leaving the repeater so as to have a certain amount of flexibility at the hinge system for linking the outer housing of the repeater to the outer housing of the splice box.

At the free end of the access cable, extra length is left on its fibers so that they project beyond the end of the tube, and they are connected to the line cable inside the splice box. Also at the free end of the access cable, the coupling mounted on the tube stripped of its sheath is fixed in the entrance of the splice box. The coupling further receives the remote powering current transmitted via the tube to the repeater. After the access cable has been connected to the splice box, the splice box and the coupling are coated with a sheath made of polyethylene injected under pressure, overlapping onto the sheath of the access cable, and providing overall sealing at the splice box.

This method of connecting a repeater to a line cable is described in particular in French Patent Application FR-A-2 606 943. In that Document, the coupling equipping the end of the access cable is provided such that it constitutes a mechanical fuse which breaks when abnormally strong forces are exerted on the access cable. Such forces occur essentially while the access cable is being handled during connection of the repeater to the line cable, and during injection of the sheath coating the splice box and the coupling together with the adjoining sheathed portion of the access cable. Such forces can cause the fixing between the coupling and the entrance of the box to break in order to avoid damage at the repeater end, which damage may give rise to ingress of water into the case containing the repeater.

This point of weakness at the fixing between the coupling and the entrance of the splice box leads to relatively complex dispositions being provided at the entrance of the splice box with corresponding relatively long times being required for laying the link. Furthermore, when the fixing between the coupling and the entrance of the splice box breaks, the fixing (currently generally performed by soldering) between the coupling and the end of the tube in the access cable also often breaks, at least partially, and needs repairing.

An object of the present invention is to equip the free end of a repeater access cable with a coupling for fixing it to the splice box, the coupling having mechanical strength comparable to that of the access cable itself and making it possible both to simplify the method of fixing to the splice box, and also to reduce the time required for fixing and the overall time required for any repair.

SUMMARY OF THE INVENTION

The present invention therefore provides an under-sea repeater access cable, coming from a repeater and providing connection thereof to an under-sea line cable inside a splice box, said access cable containing transmission members enclosed in a protective tube which is in turn covered by a sheath, with that end of said access cable which is opposite from the repeater being a free end equipped with an end coupling fitted over and fixed onto said protective tube which is free of said sheath at this end, with said coupling having a central fixing portion for fixing into an entrance of the splice box and, at respective ends, a first end portion received in said splice box and an opposite second end portion which remains outside the splice box, wherein said central portion of the coupling has direct anchoring means for anchoring it directly in the entrance of the splice box, and wherein said second end portion of the coupling is crimped and has an inner glue joint between said second end portion and the protective tube, with said joint being made of high mechanical strength glue, so that the fixings of the coupling onto said protective tube and into said splice box are given mechanical properties comparable to the mechanical properties of the sheathed protective tube.

The repeater access cable further has at least one of the following features:

said second end portion of the coupling has at least three crimped regions on the protective tube along said second end portion, with each crimped region being angularly offset relative to its adjacent region, preferably substantially by 90°;

said inner glue joint is made of a glue filled with CARBORUNDUM ® non-skid power;

with both the protective tube and the coupling being made of metal, the coupling further includes a film of conductive varnish interposed between said coupling and said protective tube, in those portions of them which have no glue between them;

with the transmission members being optical fibers, said free end further includes a rigid capillary tube surrounding said fibers and inside said protective tube, with said capillary tube extending through said protective tube and beyond the second end portion of said coupling fixed on said protective tube.

BRIEF DESCRIPTION OF THE DRAWINGS

An embodiment of the invention is described by way of example with reference to the accompanying drawings, in which.

DETAILED DESCRIPTION

Figure 1:
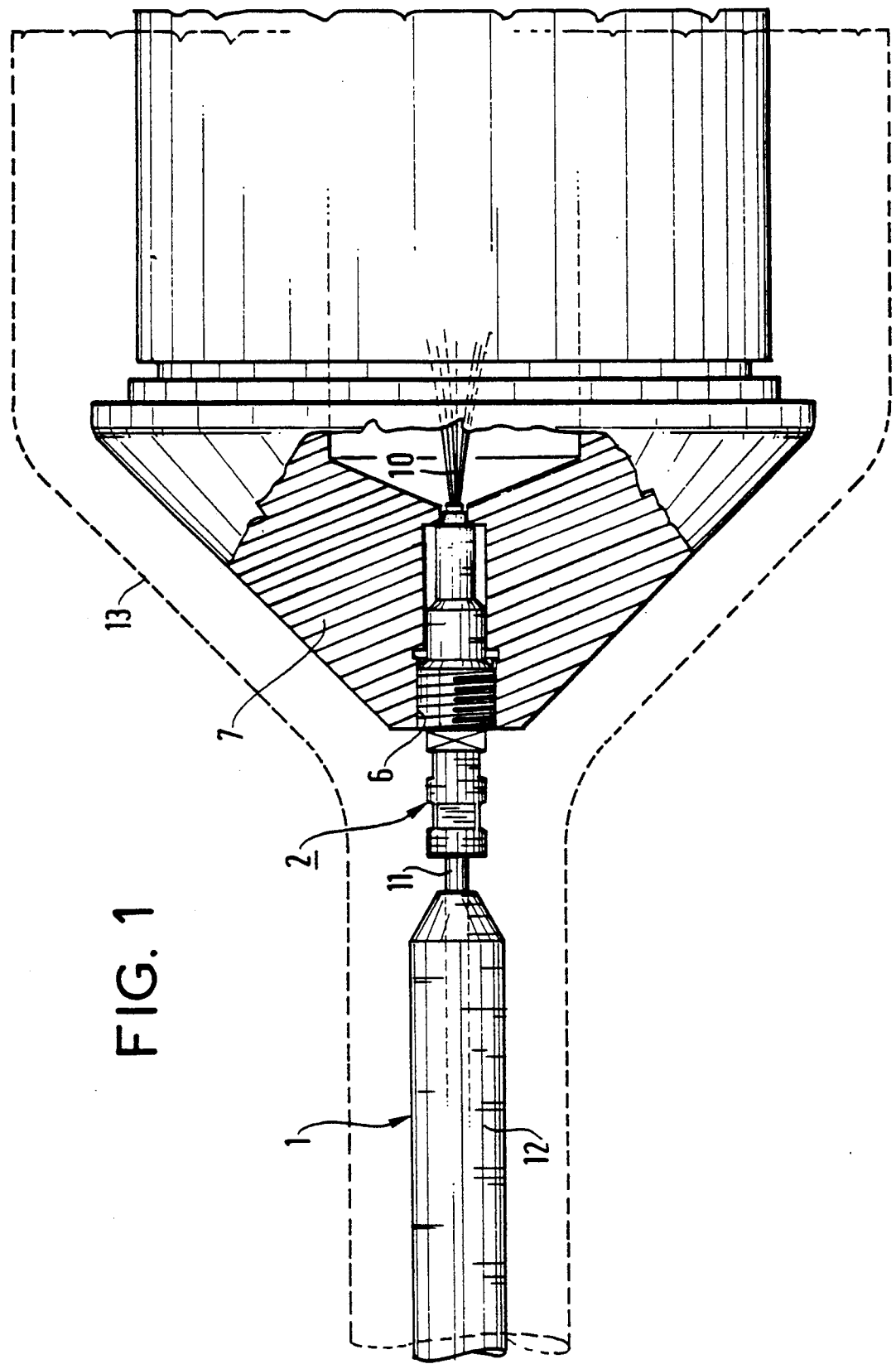
FIG. 1 is a diagrammatic fragmentary view of a repeater access cable showing the free end of the access cable equipped in accordance with the invention and mounted in the entrance of a splice box.

FIG. 1 shows the free end only of a repeater access cable 1. The access cable is coming from a repeater (not shown) which is to be connected to a line cable of an under-sea transmission link inside a splice box. Its free end is equipped with a coupling 2.

The coupling has a substantially central portion 3 forming a shoulder relative to the two end portions 4 and 5 which are situated at respective ends thereof. The central portion 3 has a thread 3A and is screwed directly into a corresponding entrance 6 provided for this purpose in a line cable splice box 7 or, to be more precise, in the cover of the splice box. The end portion 4 of the coupling comes inside the splice box, and the other end portion 5 remains outside the splice box.

In an optical fiber under-sea cable transmission link, the access cable 1 has optical fibers 10. As can be seen in FIG. 1 and particularly in FIG. 2, the optical fibers 10 are enclosed in a protective metal tube 11 which is in turn covered by a polyethylene sheath 12. The optical fibers 10 convey traffic from the splice box, inside which they are connected in a known manner (not shown) to the line cable fibers, to the repeater equipped at each of its ends with such an access cable. The metal tube 11 transmits remote powering for the repeater from the splice box. The sheath 12 protects the tube 11 electrically.

Extra length is left on the optical fibers 10 at the free end of the access cable so that they project beyond the tube 11. The coupling 2 is fixed on the tube which is free of its sheath at this end. In addition to fixing the access cable to the splice box, the coupling provides electrical connection between the splice box and the tube 11 so as to transmit the remote powering. After the access cable has been connected, the coupling, the end of the sheath 12, and the splice box are coated with a layer of polyethylene 13 providing overall sealing at the splice box end.

Figure 2:
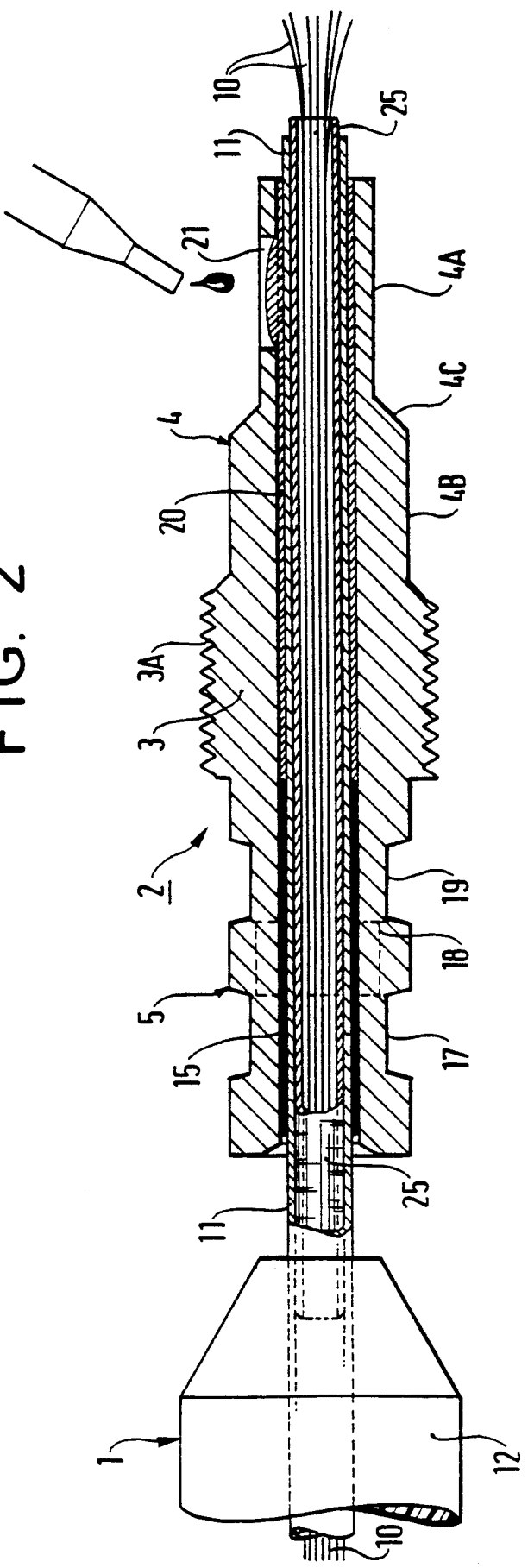
FIG. 2 is a view in section and on a larger scale than FIG. 1 of the free end of the access cable.

A description of how the coupling 2 to be screwed into the entrance of the splice box is fixed on the tube 11 is given below with reference to either FIG. 1 or to FIG. 2.

The coupling 2 fitted over the end of the tube 11 is fixed by means of a glue joint 15 constituted by a high mechanical strength glue between the tube and the end portion 5 of the coupling, and by means of crimping said end portion 5 onto said tube.

The joint 15 is made by means of glue which is about 10% filled with CARBORUNDUM ® non-skid powder.

The crimping is performed along the end portion 5 in at least three successive regions 17, 18, and 19 which are offset by 90° from one region to the next. The end portion 5 is deburred so as to leave its outside free from any trace of glue which could be detrimental to the final step of molding on the sealing layer 13.

Fixing the coupling on the tube and screwing it into the entrance of the splice box give the joins between the coupling and both the tube and the splice box mechanical properties analogous to those of the tube 11 covered by its sheath 12.

The coupling 2 further has a film of conductive varnish 20 between the tube 11 and both the other end portion 4 and preferably the central portion 3 of the coupling. The conductive film 20 provides good electrical connection between the coupling and the tube which, elsewhere, have the glue joint between them. A hole 21 opening out inside the bore of the coupling is provided in the end portion 4 so as to receive the drop or few drops of varnish necessary to constitute the conductive film, as shown diagrammatically in FIG. 2.

Advantageously, in accordance with the invention, the free end of the access cable is further equipped with a capillary tube 25 inside the tube 11. The capillary tube 25 is chosen to be of outside diameter very slightly less than the inside diameter of the tube 11. The capillary tube is threaded over the end portions of the fibers and slid inside the protective tube 11. The capillary tube is chosen to be of length greater than the length of the coupling, so as to come inside the tube 11 beyond the end portion 5 of the coupling fixed thereon. Advantageously, the capillary tube extends up to the sheathed portion of the tube 11. The capillary tube is held in place inside the protective tube 11 directly by the tube being very slightly deformed during the step of crimping the coupling thereon.

The capillary tube 25 stiffens the free end of the access cable. It prevents buckling of the protective tube 11 which contains the fibers, which is stripped of its sheath over the free end, and which is equipped with the end coupling 2. The capillary tube also avoids any risk of the fibers jamming inside the protective tube while the coupling is being crimped thereon. Furthermore, the capillary tube protects the fibers during any repair operations requiring the protective tube to be cut so that the damaged portion can be removed and a new coupling can be mounted as described above on the new end stripped of its sheath.

As regards fixing the coupling to the splice box, it should be noted that the end portion 4 of the coupling is used to guide the coupling into the entrance 6 of the splice box so that the coupling can be screwed therein. The outside surface of the end portion 4 is stepped in two portions 4A and 4B separated by a sloping shoulder end 4C and the end portion 4 abuts against the end of the bore delimiting the entrance 6. After the coupling has been fixed to the splice box and after the overall coating with the layer 13, the film of conductive varnish providing electrical connection between the coupling and the tube finds itself inside the splice box and therefore always remains protected.

I claim:

1. An under-sea repeater access cable connection to an under-sea line cable inside a splice box comprising; an under-sea repeater access cable, an under-sea line cable inside a splice box, said access cable comprising transmission members enclosed in a protective tube, a sheath covering said protective tube, an end of said access cable remote from a repeater being a free end and being equipped with an end coupling fitted over and fixed onto a portion of said protective tube which is free of said sheath, said coupling having a central fixing portion fixed into an entrance of said splice box and being provided with a first end portion received in said splice box and an opposite second end portion remaining outside the splice box, said central portion of the coupling having direct anchoring means for anchoring said central portion directly in the entrance of the splice box, and said second end portion of the coupling being crimped to and having an inner glue joint between said second end portion and the protective tube, with said inner glue joint being made of a high mechanical strength glue such that the fixing of the coupling onto said protective tube and into said splice box has mechanical properties comparable to mechanical properties of the sheathed protective tube.

2. A repeater access cable according to claim 1, wherein said second end portion of the coupling has at least three crimped regions on the protective tube along said second end portion, with each crimped region being angularly offset relative to an adjacent crimped region, substantially by 90°.

3. A repeater access cable according to claim 1, wherein the inner glue joint is made of a glue filled with non-skid powder.

4. An undersea repeater access cable connection to an under-sea line cable inside a splice box comprising; an under-sea repeater access cable, an under-sea line cable inside a splice box, said access cable comprising transmission members enclosed in a protective tube, a sheath covering said protective tube, an end of said access cable remote from a repeater being a free end and being equipped with an end coupling fitted over and fixed onto a portion of said protective tube which is free of said sheath, said coupling having a central fixing portion fixed into an entrance of said splice box and being provided with a first end portion received in said splice box and an opposite second end portion remaining outside the splice box, said central portion of the coupling having direct anchoring means for anchoring said central portion directly in the entrance of the splice box, and said second end portion of the coupling being crimped to and having an inner glue joint between said second end portion and the protective tube, with said inner glue joint being made of a high mechanical strength glue such that the fixing of the coupling onto said protective tube and into said splice box has mechanical properties comparable to mechanical properties of the sheathed protective tube, and wherein said protective tube and said end coupling are of metal, and said access cable further includes a film of conductive varnish, interposed between said end coupling and said protective tube, in portions thereof lacking said glue therebetween.

5. An undersea repeater access cable connection to an under-sea line cable inside a splice box comprising; an under-sea repeater access cable, an under-sea line cable inside a splice box, said access cable comprising transmission members enclosed in a protective tube, a sheath covering said protective tube, an end of said access cable remote from a repeater being a free end and being equipped with an end coupling fitted over and fixed onto a portion of said protective tube which is free of said sheath, said coupling having a central fixing portion fixed into an entrance of said splice box and being provided with a first end portion received in said splice box and an opposite second end portion remaining outside the splice box, said central portion of the coupling having direct anchoring means for anchoring said central portion directly in the entrance of the splice box, and said second end portion of the coupling being crimped to and having an inner glue joint between said second end portion and the protective tube, with said inner glue joint being made of a high mechanical strength glue such that the fixing of the coupling onto said protective tube and into said splice box has mechanical properties comparable to mechanical properties of the sheathed protective tube, and wherein said protective tube is of metal and the inner transmission members are constituted by optical fibers, said access cable free end further includes a rigid capillary tube surrounding said optical fibers being inside said protective tube, and said capillary tube extends through said protective tube and beyond the second end portion of said coupling fixed on said protective tube.

6. A repeater access cable according to claim 5, wherein said capillary tube is held in place in said protective tube, on said free end, by the protective tube itself and by the crimped second end portion of said coupling.

* * * * *